Nov. 6, 1962 F. W. LEHAN ET AL 3,063,017

SYNCHRONIZING NETWORK

Filed Dec. 22, 1959 4 Sheets-Sheet 1

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS
BY Allen E. Botney
ATTORNEY

FRANK W. LEHAN
RAY W. SANDERS
ALVIN W. NEWBERRY
INVENTORS

BY Allen E. Botney

ATTORNEY 3,063,017
SYNCHRONIZING NETWORK

Frank W. Lehan, Glendale, Ray W. Sanders, Los Angeles, and Alvin W. Newberry, Glendale, Calif., assignors to Space-General Corporation, Glendale, Calif., a corporation of California Filed Dec. 22, 1959, Ser. No. 861,335
19 Claims. (Cl. 328—55)

The present invention relates in general to electronic systems of the type that require some form of synchronization for their effective operation and relates more particularly to a synchronization network for such systems.

As is well known among those skilled in the electronics arts, two different but related problems normally exist and need to be resolved before intelligence in the form of modulated carrier signals can effectively be transmitted between two distant sites. The first problem is that of carrier lock, that is, the problem of making the frequency or frequency and phase of the carrier signal locally generated at the receiver site identical with that of the carrier component of the transmitted signal whereas the second problem is that of synchronizing the various circuits of the receiver apparatus so that they may respectively be rendered operable at the proper time. The first of the two problems is always important, for example, where frequency or phase modulation of the carrier is employed. As for the second problem mentioned, the need for synchronization becomes singularly important where digitalization techniques are utilized because it then becomes necessary to gate On various receiver circuits at the right moment in order to pass the pulsed information for further processing, which is to say that effective system operation depends upon proper synchronization.

Oftentimes, of course, both problems are present as may be seen, for example, from copending United States patent application Serial No. 837,956 entitled "Telemetry System," invented by Frank W. Lehan, Ray W. Sanders and Alvin W. Newberry, and filed September 3, 1959. When both problems have to be met, it is customary to first transmit an unmodulated RF carrier to provide the receiver station with the best opportunity of achieving carrier lock in a minimum of time. The transmitted unmodulated carrier is used as a reference against which the locally generated carrier is compared. Next a synchronizing signal is transmitted which may be nothing more than a coded arrangement of pulses. However, these pulses are used at the receiver station to advance or retard the time of occurrence of locally generated pulses until they ultimately occur at the right moments. It is these latter pulses that are used in the receiver equipment to synchronize the operation of its various parts.

The present invention provides a new apparatus embodying a novel technique for obtaining synchronization in systems of the type mentioned. According to the basic concept of the present invention, synchronization is achieved in two steps, the first step involving a coarse adjustment of the synchronizing pulses and the second step involving a fine adjustment of these pulses. More particularly, upon receipt of a sync code signal containing a plurality of pulses, the synchronizing network divides the sync code pulses between two channels therein, the pulses directed into the first channel providing the coarse adjustment of the synchronizing pulses by causing the time of their occurrence to be advanced or retarded until they occur approximately at the right times and the pulses directed into the second channel ultimately causing the time of occurrence of the synchronizing pulses to be incrementally advanced or retarded until they occur exactly as desired, thereby providing the fine adjustment of the synchronizing pulses. In a sense, the mechanical analog for the synchronizing network is a gauge upon which a vernier has been mounted.

In one embodiment of the invention, a first channel includes a resettable binary scaler connected to a multiple-input AND gate which produces a synchronizing pulse each time the scaler is reset. The binary scaler is triggered by clock pulses generated by a voltage-controlled clock pulse generator. This first channel also includes means connected to the binary scaler for resetting the scaler out of turn. A second channel in the embodiment, on the other hand, includes means for advancing or retarding the occurrence of the clock pulses or, stated differently, for phase shifting them. When a group of sync code pulses is received, the first pulses in the group are directed into the first channel wherein they ultimately cause the binary scaler to be reset out of turn. This shifts the synchronizing pulses to bring them into time coincidence with the sync code pulses. The remaining pulses in the sync code group are directed into the second channel wherein they ultimately have the effect of shifting the clock pulses which, in turn, causes the synchronizing pulses to be shifted further. The clock pulses are shifted in one direction or another until the synchronizing pulses are centered on the sync code pulses, that is, until they coincide with the axes of symmetry of the sync code pulses. It is thus seen in what manner the synchronizing pulses are coarsely and finely adjusted until they occur at the proper times.

It is therefore, an object of the present invention to provide a new apparatus embodying a novel technique for providing synchronizing pulses.

It is another object of the present invention to provide a synchronizing network employing digitalization techniques for supplying synchronizing pulses at the proper times.

It is a further object of the present invention to provide a synchronizing network wherein the synchronizing pulses are first coarsely and then finely adjusted to occur at the proper times.

The novel features which are believed to be characteristic of the invention, both as to its organization and method of operation, together with advantages and further objects thereof, will be better understood from the following description considered in connection with the accompanying drawings in which an embodiment of the invention, as well as modification thereof, is illustrated by way of example. It is to be expressly understood, however, that the drawings are for the purpose of illustration and description only and are not intended as a definition of the limits of the invention.

Figure 1:
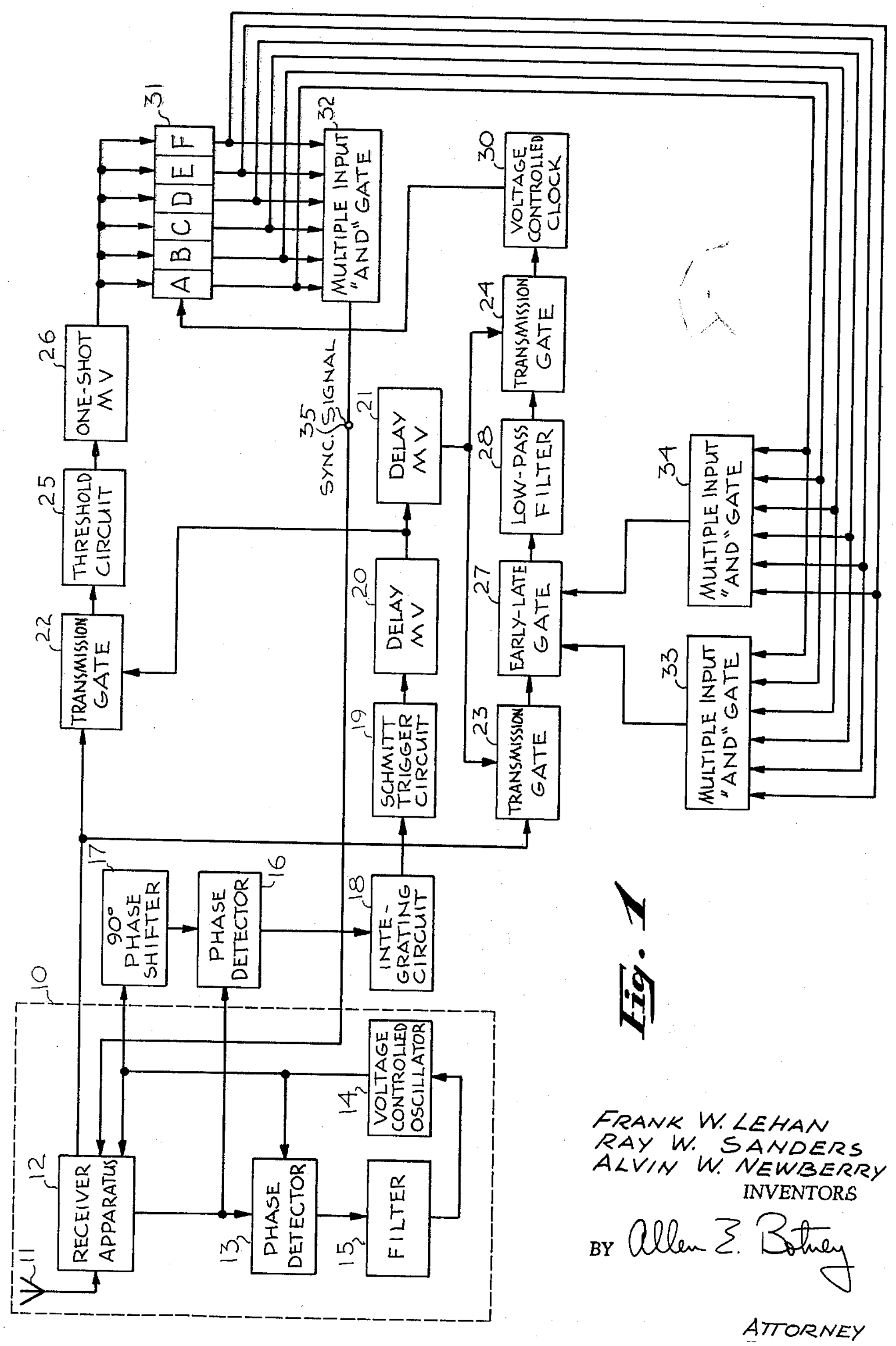
FIG. 1 is a block diagram of one embodiment of a synchronizing network according to the present invention.
Figure 2:
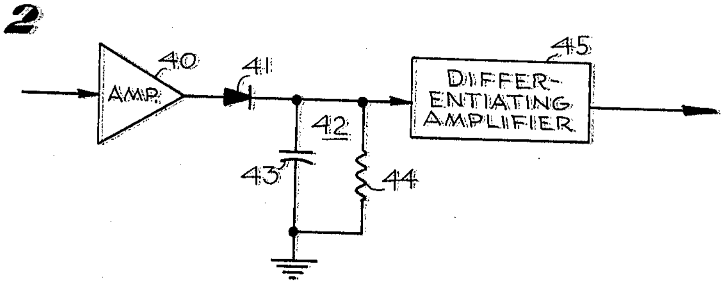
FIG. 2 illustrates one modification in the network of FIG. 1.
Figure 3:
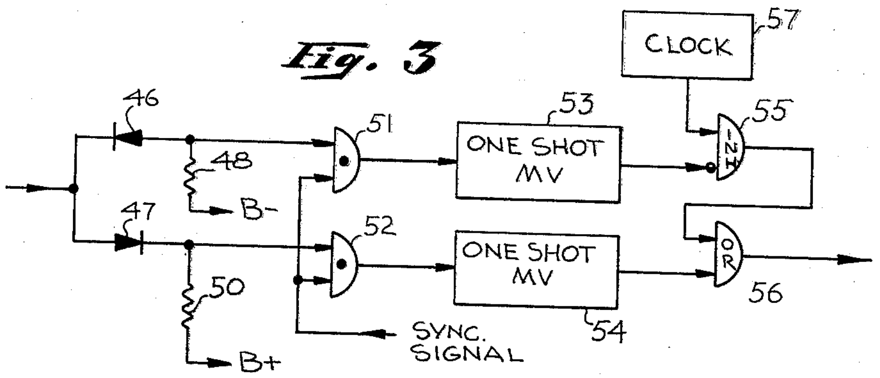
FIG. 3 illustrates another modification in the embodiment of FIG. 1.
Figure 4A:
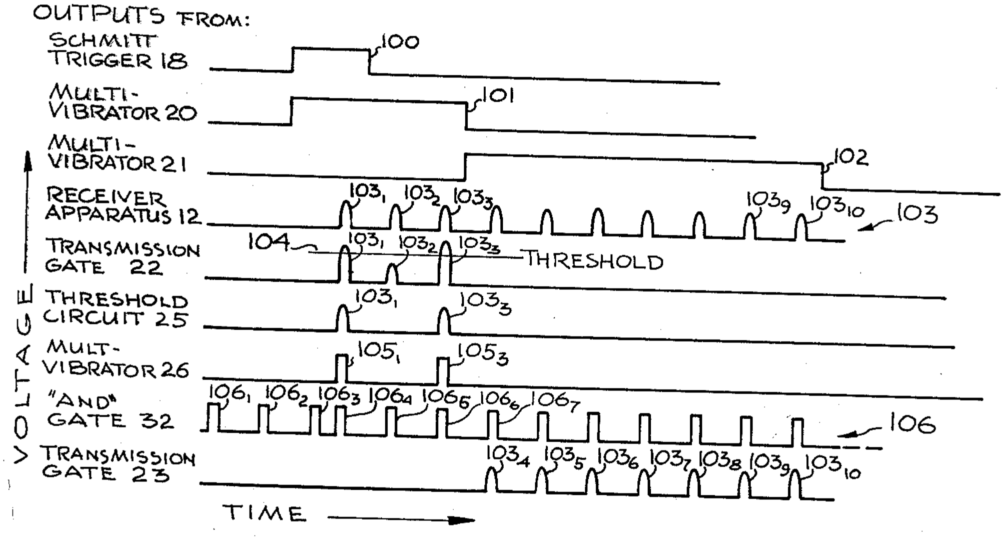

FIGS. 4(*a*), 4(*b*), 4(*c*), 5 and 6 illustrate the various voltages and signals produced at different points in the network arrangements of FIGS. 1, 2 and 3.

Considering now the drawings, particular reference is made therein to FIG. 1 wherein one embodiment of a synchronizing network according to the present invention is shown. To facilitate an understanding of the invention, the network is shown cooperatively connected to receiver equipment 10 which, together with the synchronizing network, forms a complete receiver system. However, the receiver equipment is not deemed to be a part of this invention.

Receiver equipment 10 includes an antenna 11 which feeds into some receiver apparatus 12 and since equipment 10 and, therefore, any portion thereof, is not considered as a part of the invention, a detailed description of apparatus 12 is not deemed necessary. Suffice it to say, therefore, that apparatus 12 includes the usual circuits that may be found in a receiver system, such as amplifiers, mixers, oscillators, gating circuits, decoders, etc. Receiver apparatus 12 is connected to the first of two inputs to a phase detector 13, the second input thereof being coupled to a voltage-controlled-oscillator 14 which is also coupled to the receiver apparatus. As is well known, oscillators of this type generate a signal whose frequency or phase can be controlled by a voltage applied to it. Receiver equipment 10 finally includes a low-pass filter 15 which is connected between phase detector 13 and oscillator 14.

The synchronizing network itself includes a phase detector 16 which may be identical to phase detector 13. Accordingly, phase detector 16 likewise has two inputs, the first being tied directly to the first input of phase detector 13 and the second being coupled indirectly, that is, through a 90° phase shifter 17 to the second input of phase detector 13. Consequently, like phase detector 13, phase detector 16 is coupled to receiver apparatus 12 and voltage-controlled oscillator 14 and receives the signals therefrom. Phase detector 16 is connected at its output end to an integrating circuit 18, the output end of the integrating circuit, in turn, being connected to a Schmitt trigger circuit 19. A pair of delay multivibrators 20 and 21 are connected in tandem with the Schmitt trigger circuit, as shown in the figure, the output of the first multivibrator, namely, multivibrator 20, being connected to the gating terminal of a first transmission gate 22 and the output of the second multivibrator, namely, multivibrator 21, being connected to the gating terminals of second and third transmission gates respectively designated 23 and 24.

Transmission gates 22 and 23 are also connected at their input ends to the same output terminal of receiver apparatus 12 so that both receive the same signals at the same time. Transmission gate 22 is connected at its output end to a threshold circuit 25 and a one-shot multivibrator 26 connected in tandem in the order mentioned, which is to say that threshold circuit 25 is connected between gate 22 and multivibrator 26. Transmission gate 23, on the other hand, is connected at its output end to the first of three input terminals to an early-late gate 27 whose function it is to pass only that portion of a signal applied to its first input terminal that coincides with two successive pulse intervals. Circuits that may be adapted for use as an early-late gate in the synchronizing network are shown and described on pages 384 through 387 of Volume 19 of the M.I.T. Radiation Lab Series entitled "Waveforms." The volume was prepared by Messrs. Chance, Hughes, MacNichol, Sayre, and Williams and published by McGraw-Hill Book Company, Inc., of New York in 1949.

A low-pass filter 28 is connected between early-late gate 27 at the output end thereof and transmission gate 24, the transmission gate, in turn, being connected at its output to a voltage-controlled clock 30 which generates clock pulses at a predetermined rate. Although the clock pulse rate remains constant, the occurrence of these pulses may be advanced or retarded in time under the control of a voltage applied to the clock input, as its name implies. Finally, the synchronizing network includes a 6-digit binary scaler 31 and three multiple input "AND" gates respectively designated 32, 33 and 34. In general, scaler 31 is connected at its various input terminals to both one-shot multivibrator 26 and voltage-controlled clock 30, the scaler being coupled at its plural output terminals to all three multiple input "AND" gates 32, 33 and 34. The output ends of gates 32, 33 and 34 are respectively connected to the output terminal for the synchronizing network, designated 35, and to the second and third input terminals of early-late gate 27.

More particularly, scaler 31 has six stages designated A through F, the first stage, that is, stage A, being coupled at its input to clock 30 in order to receive the clock pulses therefrom. Each of the scaler stages is resettable and for this purpose their reset terminals are connected to the output of multivibrator 26. The six outputs from scaler 31, each such output schematically representing the two output terminals of a flip-flop, are respectively connected to six inputs to multiple input "AND" gate 32. Multiple input "AND" gates 33 and 34, each of which also has six inputs, are similarly connected to the scaler outputs. An electronic arrangement that may easily be adapted for use as a multiple input "AND" gate in the present synchronizing network is shown and described on pages 72 through 82 of the book entitled "Electronic Circuit Theory," written by Henry J. Zimmerman and Samuel J. Mason and published in New York by Wiley and Sons in 1959.

As mentioned previously, the output ends of gates 33 and 34 are respectively coupled to the second and third inputs to early-late gate 27, and terminal 35 is the output point for the synchronizing network. Terminal 35 is fed back to receiver apparatus 12 for reasons that will briefly be mentioned later.

Considering now the operation, when an unmodulated carrier signal, transmitted to provide carrier lock as defined above, is intercepted by antenna 11, the carrier is applied to receiver apparatus 12 wherein it is processed in a conventional manner. Thus, the carrier signal is amplified, mixed, etc., to provide an intermediate-frequency carrier signal that is applied to phase detector 13 to which is also applied another carrier signal generated by voltage-controlled oscillator 14. The two carrier signals are at the same frequency but out of phase with each other, with the result that the phase detector produces a varying error voltage that is smoothed by filter 15. This error voltage is returned to oscillator 14 which responds to the voltage signal to vary the phase of the locally generated carrier until it is in phase with the carrier out of the receiver apparatus. At this point, what has been termed as carrier lock is achieved and the error voltage is reduced to zero.

The locally generated carrier signal out of oscillator 14 is applied to 90° phase shifter 17 which, as its name implies, shifts the phase of this signal by 90° and thereafter feeds it into phase detector 16. The intermediate-frequency carrier out of receiver apparatus 12 is also applied to phase detector 16 and since the two signals applied thereto are out of phase with each other by 90°, a maximum voltage signal is applied to intergrating circuit 18. The output of the integrating circuit is an exponentially rising voltage and when this output voltage reaches a voltage level determined by the parameters of Schmitt trigger circuit 19, the circuit is triggered into producing a rectangular pulse which is designated 100 in FIG. 4*a*. This rectangular pulse is applied to delay multivibrator 20 which, in response thereto, produces another rectangular pulse 101 of the type illustrated in FIG. 4*a*. Pulse 101 is then used to cause delay multivibrator 21 to produce a third rectangular pulse designated in the figure as 102. This may be done by first differentiating rectangular pulse 101 to produce two voltage spikes therefrom, one spike coinciding with the leading edge of pulse 101 and the other spike coinciding with the lagging edge of pulse 101. The latter voltage spike is then used to trigger delay multivibrator 21 into producing pulse 102 whose leading edge, it will be seen from the figure, coincides with the lagging edge of pulse 101. Pulse 101 is applied to transmission gate 22 while pulse 102 is applied to transmission gates 23 and 24.

Following the period during which the carrier lock signal is received but during the interval of pulses 101 and 102, a sync code signal is intercepted by antenna 11 and applied to receiver apparatus 12. This sync code signal is demodulated in apparatus 12 and in its demodulated form applied to transmission gates 22 and 23. As may be seen from FIG. 4*a*, the signal out of receiver apparatus 12 preferably takes the form of a series of pulses which substantially resemble half cycles of a sinusoidal oscillation. In the present instance, the pulse sequence is shown to include only 10 pulses, namely, pulses $103_1$ to $103_{10}$, but it is to be understood that fewer or greater than 10 pulses may be included in the sequence. Furthermore, some of the sync code pulses, specifically pulses $103_1$, $103_2$ and $103_3$, coincide with rectangular pulse 101 while the remaining pulses occur during the interval of rectangular pulse 102.

Considering the effects of pulse 101 and pulses $103_1$, $103_2$ and $103_3$ first, transmission gate 22 is gated ON by pulse 101, with the result that pulses $103_1$, $103_2$ and $103_3$ are passed through the transmission gate to threshold circuit 25 whose threshold voltage is preferably set at a level that is slightly less than the peak value of pulses $103_1$ to $103_{10}$. Due to the fact that noise may increase or decrease the respective amplitudes of pulses $103_1$ to $103_3$, all or less than all of these pulses may be expected to exceed the threshold voltage established by circuit 25. Consequently, all or less than all of pulses $103_1$ to $103_3$ may be expected to pass through threshold circuit 25 to one-shot multivibrator 26. In the scheme used herein to illustrate the operation of the present invention, pulses $103_1$ and $103_3$ have been shown in the figure as exceeding the threshold voltage which is designated 104 whereas pulse $103_2$ is shown to fall below the threshold. Hence, pulses $103_1$ and $103_3$ are successively applied to multivibrator 26 which, in response thereto, produces a corresponding pair of pulses designated $105_1$ and $105_3$. Pulses $105_1$ and $105_3$ are applied to the six stages of binary scaler 31 and have the effect of resetting the scaler for reasons that will be more fully discussed later.

With respect to binary scaler 31, voltage-controlled clock 30 generates a train of clock pulses which are applied to the first stage of the scaler, namely, stage A. In consequence thereof, stages A through F of binary scaler 31 are activated to respectively produce trains of binary signals, the pulse repetition rate of each stage being one-half that of the preceding stage, the pulse repetition rate of stage A being one-half that of the clock pulse rate. Since scaler 31 has six stages, it will be obvious to those skilled in the art that the pulse repetition rate of stage F is one sixty-fourth that of the clock pulse rate and, furthermore, since the clock pulse rate is purposely made sixty-four times greater that the pulse repetition rate of sync code pulses $103_1$ to $103_{10}$, it will therefore be apparent that the pulse repetition rate of stage F is the same as the pulse repetition rate of pulses $103_1$ to $103_{10}$ The various pulse trains produced by stages A through F of binary scaler 31 are applied to the corresponding inputs of multiple-input AND gate 32 which, in response thereto, produces a synchronizing pulse at output terminal 35 for each succession of sixty-four clock pulses applied to stage A. In other words, AND gate 32 is designed to produce an output pulse when a predetermined pattern of pulses is simultaneously produced by the stages of scaler 31 and this pattern is developed at the scaler output only once for each group of sixty-four clock pulses applied to it. In the present instance, a synchronizing pulse is produced each time the stages of scaler 31 are reset. Thus, with the passage of time, a train of synchronizing pulses having the same pulse repetition frequency as sync code pulses $103_1$ to $103_{10}$ is applied to output terminal 35. This pulse train is generally designated 106 in FIG. 4*a*, the first half dozen of the synchronizing pulses therein being designated $106_1$ to $106_6$.

Initially, synchronizing pulses 106 do not occur at the same time as sync code pulses 103, that is to say, pulses 106 are not coincident with pulses 103, as may be seen from the position of pulses $106_1$, $106_2$ and $106_3$ in the pulse train. Stated differently, scaler 31 is normally reset at times that do not coincide with the occurrence of sync code pulses $103_1$ through $103_{10}$. However, scaler 31 is reset out of turn when pulse $105_1$ is applied to the stages of scaler 31 and since pulse $105_1$ is in coincidence with pulse $103_1$, synchronizing pulses 106 thereafter occur coincidentally with pulses $103_1$ through $103_{10}$. In other words, it may be said that the pulses out of one-shot multivibrator 26 (pulses $105_1$ and $105_3$) advance or retard, that is, shift the phase of, pulses 106 until they occur at the same time as pulses 103. When this happens, the occurrence of the synchronizing pulses is substantially as desired and it remains only to slightly shift the position or occurrence of these pulses until their leading edges are centered on pulses 103 or, stated differently, until their leading edges respectively coincide with the axes of symmetry of pulses 103. This result is achieved with the aid of multiple-input "AND" gates 33 and 34, early-late gate 27, and the circuitry associated with them, to which attention is now directed, particularly transmission gates 23 and 24.

Accordingly, when pulse 102 out of delay multivibrator 21 is applied to transmission gates 23 and 24, these gates are gated On to pass any pulses applied to them during the interval of pulse 102. Consequently, pulses $103_4$ through $103_{10}$ pass through transmission gate 23 to early-late gate 27. Pulses $103_4$ through $103_{10}$ are separately shown in FIG. 4*a*, a couple of them, namely, pulses $103_4$ and $103_5$ being reproduced on a larger time scale in FIG. 4*b*.

Figure 4B:
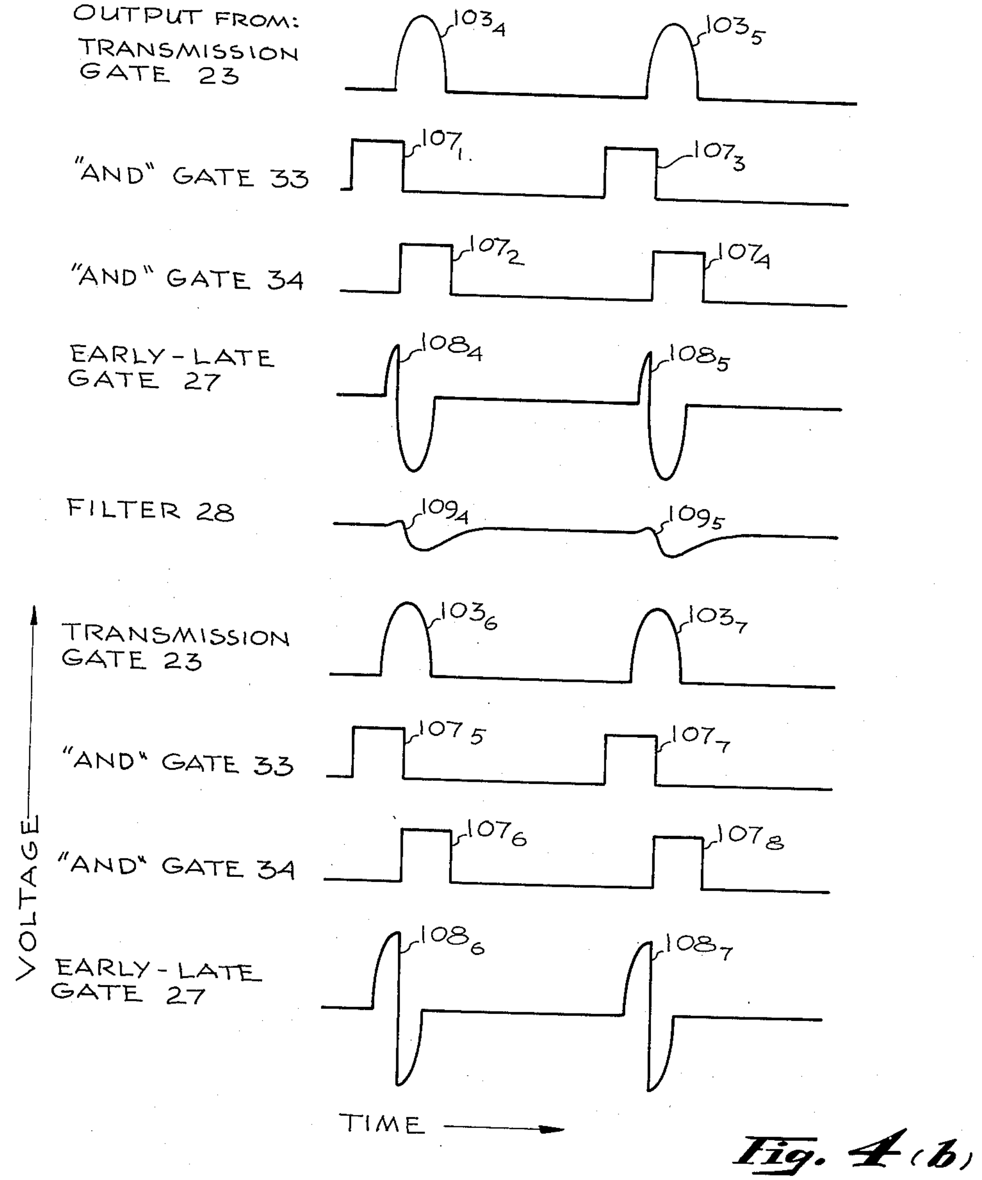

Considering multiple-input AND gates 33 and 34, the signals produced by scaler 31 and applied to multiple-input AND gate 32 are also applied to AND gates 33 and 34. These AND gates are adjusted to be responsive to two successive scaler signal patterns to produce two successive pulses, AND gate 33 producing the first pulse which is immediately followed by the second pulse produced by AND gate 34. Furthermore, the AND gates are adjusted so that when these pulses are produced, they overlap pulses $103_4$ and $103_5$. More particularly, AND gates 33 and 34 respectively produce pulses $107_1$, $107_2$ and pulses $107_3$, $107_4$, pulses $107_1$ and $107_2$ occurring during the period of pulse $103_4$ and pulses $107_3$ and $107_4$ occurring during the period of pulse $103_5$, as shown in FIG. 4*b*.

AND gates 33 and 34 respectively apply pulses $107_1$ and $107_2$ to early-late gate 27 and, as a result, the portion of pulse $103_4$ that coincides with pulse $107_1$ is passed to low-pass filter 28 whereas the portion of pulse $103_4$ that coincides with pulse $107_2$ is first inverted and then applied to the filter. Thus, filter 28 receives both positive and negative portions of pulse $103_4$, how much of pulse $103_4$ is positive or negative depending upon how much of this pulse is superimposed in time upon pulse $107_1$ or $107_2$. Of course, the effects produced by pulses $107_3$ and $107_4$ when they are subsequently applied to early-late gate 27 are the same as those brought about by pulses $107_1$ and $107_2$. Accordingly, to avoid being redundant, it is not deemed necessary to describe these effects but they are illustrated in FIG. 4*b*.

As a result of the action of early-late gate 27 on pulse $103_4$ in response to pulses $107_1$ and $107_2$, and on pulse $103_5$ in response to pulses $107_3$ and $107_4$, voltage waveforms of the type designated $108_4$ and $108_5$ are applied to low-pass filter 28 wherein they are smoothed to produce negative going voltage waveforms $109_4$ and $109_5$. Waveforms $109_4$ and $109_5$ are negative because the algebraic sum of the areas under curves $108_4$ and $108_5$ are negative. It will be recognized, therefore, that voltage waveforms $109_4$ and $109_5$ would be positive if pulses $107_1$, $107_2$ and pulses $107_3$, $107_4$ were positioned relative to pulses $103_4$ and $103_5$ so that the algebraic sum of the areas under curves $108_4$ and $108_5$ were positive.

Transmission gate 24, which has been gated ON by pulse 102 allows voltage waveforms $109_4$ and $109_5$ to pass through to voltage-controlled clock 30 and they have the effect of advancing or delaying the occurrence of the clock pulses produced thereat and applied to stage A of scaler 31. By so advancing or retarding the occurrence of the clock pulses, the signal patterns out of scaler 31 that respectively affect multiple-input AND gates 32, 33 and 34 are correspondingly advanced or retarded in time, with the result that synchronizing pulses 106 out of AND gate 32 and pulses 107 out of AND gates 32 and 34 are likewise advanced or retarded in time. With the shifting of the signals and pulses mentioned, synchronizing pulses 106 are brought into alignment with the axes of symmetry of sync code pulses 103, that is, pulses 106 are centered on pulses 103, which is the result sought.

Figure 4C:
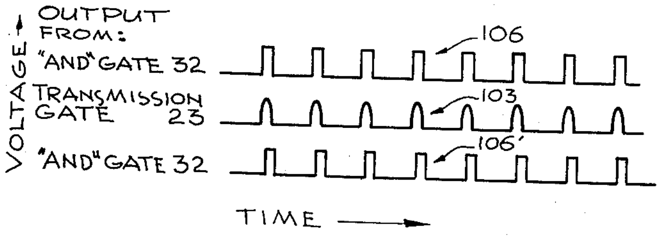

The described final adjustment of the synchronizing pulses is illustrated in FIGS. 4*b* and 4*c*, in FIG. 4*b*, by means of pulses $103_6$ and $103_7$, pulses $107_5$, $107_6$ and $107_7$ and $107_8$ and waveforms $108_6$ and $108_7$, and in FIG. 4*c* by means of pulses 103 and pulses 106. More specifically, for the reasons explained above, negative voltages $109_4$ and $109_5$ ultimately cause the succeeding pulses produced by AND gates 33 and 34, namely, pulses $107_5$, $107_6$ and $107_7$, $107_8$, to be retarded until the lagging and leading edges of pulses $107_5$ and $107_6$, respectively, are centered on pulse $103_6$ and the lagging and leading edges of pulses $107_7$ and $107_8$, respectively, are centered on pulse $103_7$. When this happens, voltage 109 is reduced to zero and no further shifting of pulses takes place. Consequently, synchronizing pulses 106 thereafter remain centered on pulses 103, as previously mentioned. The position of pulses 106 relative to pulses 103 before and after their final adjustment are shown in FIG. 4*c* by the respective designations 106 and 106′. As shown, the leading edges of pulses 106′ are respectively centered on pulses 103.

Having described the operation of the present invention as it is embodied in the synchronizing network of FIG. 1, it will thus be seen that the present invention provides synchronizing pulses that may be adjusted in two steps as to their time of occurrence, the first step involving a coarse adjustment in which the synchronizing pulses are advanced or retarded in time until they occur substantially at the right moment and the second step involving a fine adjustment in which the synchronizing pulses are again advanced or retarded in time until they occur exactly as desired. In a sense, therefore, it may be said that the synchronizing network of the present invention is an electronic counterpart of the mechanical gauge and vernier by which coarse and fine measurements or regulations are made.

The synchronizing network may be modified in several respects as shown by the circuit diagrams of FIGS. 2 and 3. More specifically, the synchronizing network may be modified in one way by substituting the circuit of FIG. 2 for threshold circuit 25 in FIG. 1 and in another way by replacing transmission gate 24 and voltage-controlled clock 30, also of FIG. 1, with the circuit of FIG. 3.

Considering first the substitution of the FIG. 2 circuit for threshold circuit 25, the circuit to be substituted includes a low-output-impedance amplifier 40 connected at its input end to transmission gate 22 and at its output end to the anode of a diode 41 whose cathode is connected to an integrating circuit generally designated 42. Integrating circuit 42 includes a capacitor 43 and a resistor 44 connected in parallel, one junction point between the two elements being connected to ground and the other junction point between them being connected to both the cathode of diode 41 and a differentiating amplifier 45. The differentiating amplifier is connected at its output end to one-shot multivibrator 26, as was the threshold circuit previously.

Figure 5:
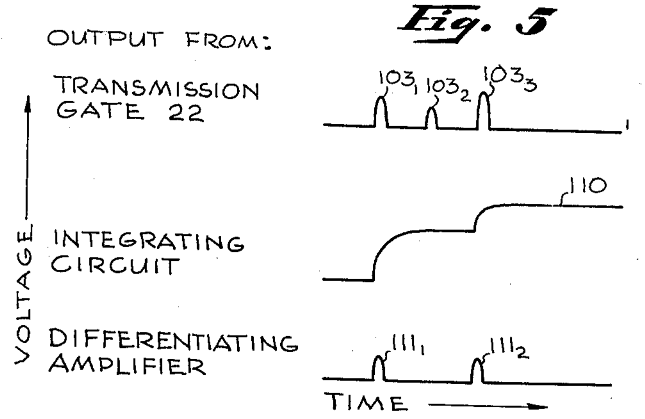

Considering now the operation of the synchronizing network of FIG. 1 with threshold circuit 25 replaced by the circuit of FIG. 2, it should first be mentioned that, except for the substituted portion, the operation of the synchronizing network is exactly as it was previously described and, hence, will not be described again. As for the operation of the circuit shown in FIG. 2, pulses $103_1$, $103_2$ and $103_3$ out of transmission gate 22 are amplified by amplifier 40 and then applied to diode 41. Assuming, as before, that noise has caused the amplitudes of pulses $103_1$, $103_2$, and $103_3$ to vary, specifically that the amplitude of pulse $103_1$ has been increased by the noise, the amplitude of $103_2$ has been decreased by the noise and the amplitude of $103_3$ has been increased by the noise to a greater extent than that of pulse $103_1$, it will be seen that only pulses $103_1$ and $103_3$ will pass through diode 41 to integrating circuit 42. The reason for this is that diode 41 is back biased by the voltage developed across capacitor 43 in response to pulse $103_1$ and only pulse $103_3$ of the two remaining pulses can exceed this biasing voltage. Consequently, the output voltage produced by integrating circuit 42 and applied to differentiating amplifier 45 is as illustrated by waveform 110 in FIG. 5, the two rises in the waveform respectively corresponding to pulses $103_1$ and $103_3$. Differentiating amplifier 45 first differentiates voltage 110 and then amplifies the voltage spikes produced thereby to develop a pair of pulses $111_1$ and $111_2$, as shown in the figure. Pulses $111_1$ and $111_2$ are applied to one-shot multivibrator 26 as were pulses $105_1$ and $105_3$ out of the threshold circuit. As mentioned previously, the rest of the operation is the same.

It was assumed above that noise had decreased the amplitude of pulse $103_2$ below that of pulse $103_1$ and $103_3$, the result being, as already explained, that only pulses $103_1$ and $103_3$ were passed through diode 41 to produce corresponding pulses $111_1$ and $111_2$. If, on the other hand, pulse $103_1$ had the greatest of the three amplitudes, then only pulse $103_1$ would pass through the diode. In this case, the diode would be biased at a higher level than in the case previously assumed and thereby would prevent either of pulses $103_2$ or $103_3$ from passing through. In consequence thereof, only pulse $111_1$ would be produced at the output of differentiating amplifier 45 but, as will be recognized, this would not impair the network's operation. On the other hand, if pulse $103_1$ had the least amplitude and pulse $103_3$ had the greatest amplitude, the amplitude of pulse $103_2$ falling therebetween, then all three pulses would pass through to integrating circuit 42 since each of them would exceed the bias on diode 41 when applied to it. As a result, three pulses would appear at the output of the differentiating amplifier, namely pulses $111_1$, $111_2$ and $111_3$, coinciding in time with the three rises that would thereby be produced in voltage 110. Here, too, the network would operate as effectively as in the first case assumed.

Giving consideration now to the second possible modification of the synchronizing circuit, namely, the substitution of the circuit of FIG. 3 for transmission gate 24 and voltage-controlled clock 30, the FIG. 3 circuit is shown to include a pair of diodes respectively designated 46 and 47, the cathode of one diode and the anode of the other diode being connected to the output end of low-pass filter 28 of FIG. 1. In the present instance, it is the cathode of diode 46 and the anode of diode 47 that are connected to the filter. On the other hand, the anode of diode 46 is connected through a resistor 48 to a source of negative voltage, designated B−, which normally back-biases this diode, diode 47 similarly being back-biased by having its cathode coupled through a resistor 50 to a source of positive voltage, designated B+.

The network modification of FIG. 3 further includes a pair of AND gates 51 and 52, each having two input terminals, one of these terminals in each gate being connected to the output of multiple-input AND gate 32 so as to receive the synchronizing pulses therefrom. The of the two inputs to AND gate 51 is connected directly to the anode of diode 46 while the other of the two inputs to AND gate 52 is connected directly to the cathode of diode 47. A pair of one-shot multivibrators 53 and 54 are respectively connected between gates 51 and 52 and a new pair of gates 55 and 56, gate 55 being an INHIBIT gate and gate 56 being an OR gate. More specifically, multivibrator 53 is connected to the INHIBIT terminal of gate 55, the other gate terminal being connected directly to a clock pulse generator 57. Multivibrator 54 is connected to either one of the two input terminals to OR gate 56, the other terminal thereof being connected directly to the output of INHIBIT gate 55. The output of OR gate 56 is the output for the entire circuit arrangement of FIG. 3 and is connected to the input of stage A in scaler 31.

In order to understand the operation, it should first be mentioned that the circuit of FIG. 3 has two channels and that one channel is rendered operable in response to a negative voltage out of low-pass filter 28 whereas a positive filter voltage renders the other channel operable. Accordingly, it will initially be assumed that negative voltages are developed at the output of filter 28 and that these voltages are of sufficient magnitude to overcome the biasing of diode 46. Such voltages are illustrated by waveforms $\mathbf{112}_4$ and $\mathbf{112}_5$ in FIG. 6 and from the illustration it is seen that voltages $\mathbf{112}_4$ and $\mathbf{112}_5$ are each in the nature of a pulse of sufficient duration to coincide with at least one pulse of synchronizing pulses 106. The result is that when voltages $\mathbf{112}_4$ and $\mathbf{112}_5$ are applied to AND gate 51, synchronizing pulses are also applied thereto and, in response to these two inputs, the AND gate applies pulses in succession to one-shot multivibrator 53. The multivibrator then applies corresponding pulses to the INHIBIT terminal of gate 55, the duration of each of the pulses, designated $\mathbf{113}_1$ and $\mathbf{113}_2$ in FIG. 6, being equal to the period of clock pulses 114 generated by clock 57. As a result, gate 55 is inhibited for a period of time that is sufficient to prevent one of the clock pulses from getting through to OR gate 56. Hence, the clock pulse train applied by OR gate 56 to scaler 31 "skips a pulse" each time multivibrator 53 applies a pulse to INHIBIT gate 55. The clock pulse train wherein pulses are missing for the reasons explained is shown in FIG. 6 and is generally designated 115 therein.

The absence of pulses causes corresponding delays in the occurrence of the desired signal pattern out of scaler 31 that activates AND gate 32 and this, in turn, delays the occurrence of the synchronizing pulses produced by AND gate 32, the period of delay for each omission being equal to the period between two successive clock pulses. A negative voltage will continue to be developed at the output of filter 28 and consequently, the synchronizing pulses will continue to be delayed by further increments of time until the synchronizing pulses occur at the proper time. When this happens, the voltage out of filter 28 will be reduced to zero and the synchronizing pulses will remain as they are, that is, they will no longer be retarded in time.

Figure 6:
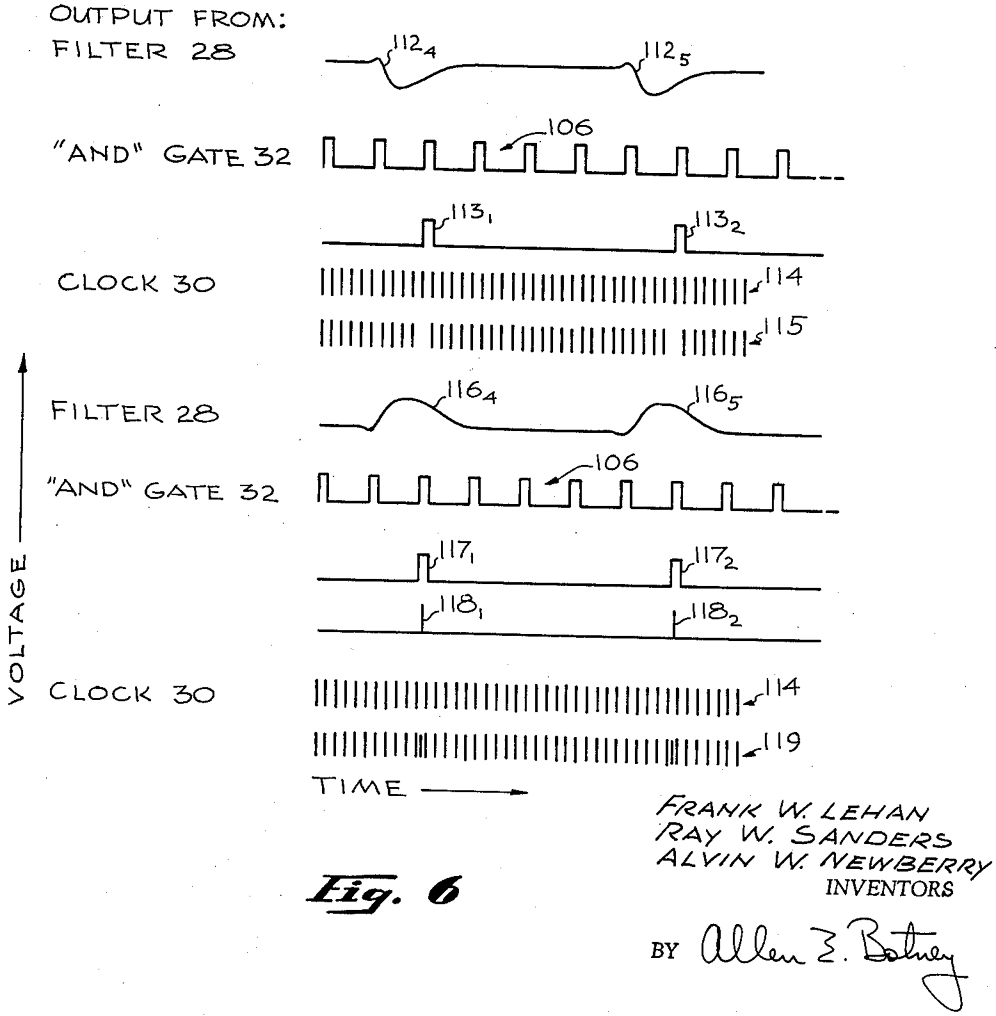

If positive voltages are at any time developed at the output of filter 28, such as voltages $\mathbf{116}_4$ and $\mathbf{116}_5$ in FIG. 6, then diode 47 becomes forward biased and simultaneous pulses are applied to AND gate 52 which is then activated to produce pulses $\mathbf{117}_1$ and $\mathbf{117}_2$. These pulses are applied to one-shot multivibrator 54 which, in response thereto, produces pulses $\mathbf{118}_1$ and $\mathbf{118}_2$ that are, in essence, additional clock pulses. In other words, pulses $\mathbf{118}_1$ and $\mathbf{118}_2$ have substantially the same duration as clock pulses 114 produced by clock 57 and fall between them. Consequently, the clock pulses applied by OR gate 56 to scaler 31 include pulses $\mathbf{118}_1$ and $\mathbf{118}_2$ among them, the clock pulse train containing these extra pulses being shown in FIG. 6 and generally designated 119 therein. The crowding of clock pulses 114 by the addition of pulses $\mathbf{118}_1$ and $\mathbf{118}_2$ causes the pulse pattern out of scaler 31 that affects multiple-input AND gate 32 to be produced sooner and this, in turn, advances the occurrence of the synchronizing pulses produced by AND gate 32. This advancement of the synchronizing pulses by small increments of time continues until they occur at the proper times, at which time the positive voltages developed at the output of filter 28 will be reduced to zero. When this happens, synchronizing pulses 106 will thereafter remain fixed insofar as their time of occurrence is concerned. Here again, the rest of the synchronizing network operates exactly as previously described and, hence, need not be described again here.

While a few variations have been shown and pointed out in the discussion herein, it will be understood that the invention is not so limited but is generic to a wide class of networks for producing synchronizing pulses wherein provision is made for first coarsely and then finely translating the pulses in time to insure their occurrence at the proper times. Accordingly, the scope of the invention as defined in the appended claims is intended to be commensurate with a large class of networks including many variations that will be apparent to those skilled in the art. For example, the clock pulses may be generated at any suitable rate and scaler 31 may be modified as to the number of stages therein according to the clock pulse rate selected. Thus, if a 5-stage scaler were to be used instead of one having 6 stages, then the clock pulse rate would be only 32 times the signal rate of the last stage in the scaler rather than 32 times that rate as described above.

Having thus described the invention, what is claimed as new is:

1. A network that is responsive to a sync code signal comprising a sequence of pulses to produce synchronizing pulses having a predetermined time relationship with said sync code pulses, said network comprising: an adjustable source of synchronizing pulses; first means coupled to said source and operable in response to a first occurring group of sync code pulses in the sequence to advance the synchronizing pulses until they are in a predetermined first time relationship with the sync code pulses; and second means coupled to said source and operable in response to a second occurring group of sync code pulses in the sequence to shift the synchronizing pulses in time until they are in a predetermined second time relationship with the sync code pulses.

2. A network that is responsive to a sync code signal comprising a sequence of pulses to produce synchronizing pulses having a predetermined time relationship with said sync code pulses, said network comprising: means for generating clock pulses at a rate that is $2^n$ times greater than the pulse repetition rate of the sync code pulses, where $n$ is an integer greater than zero; a binary scaler coupled to said means and having $n$ stages, said scaler being operable in response to each successive group of $2^n$ clock pulses to produce a predetermined output signal pattern; output means coupled to said binary scaler and operable in response to each said predetermined output signal pattern to produce a synchronizing pulse, whereby a train of synchronizing pulses is produced having the same pulse repetition frequency as the sync code pulses; first means coupled to said binary scaler and operable in response to a first occurring group of sync code pulses in the sequence to advance the synchronizing pulses until they are in a predetermined first time relationship with the sync code pulses; and second means coupled to said clock pulse generating means and operable in response to a second occurring group of sync code pulses in the sequence to shift said clock pulses in time until the synchronizing pulses are in a predetermined second time relationship with the sync code pulses.

3. The network defined in claim 2 wherein said first means includes a gating circuit receptive of the sync code pulses, means for gating On said gating circuit to pass said first occurring group of sync code pulses; a threshold circuit coupled to said gating circuit for producing a pulse in response to each sync code pulse in said passed group that exceeds the threshold voltage level of said circuit; and a one-shot multivibrator coupled to said threshold circuit and to said binary scaler in such a manner as to reset the $n$ stages of said scaler in response to each pulse produced by said threshold circuit.

4. The network defined in claim 2 wherein said first means includes a gating circuit receptive of the sync code pulses; means for gating On said gating circuit to pass said first occurring group of sync code pulses; a diode and an integrating circuit connected in series between said gating circuit and ground, the diode being connected in said gating circuit, said integrating circuit producing a voltage that successively roses exponentially in response to those of said first occurring group of sync code pulses that pass through said diode; a differentiating circuit connected to said integrating circuit, said differentiating circuit producing voltage spikes in response to the rising portions of the voltage out of said integrating circuit; and a one-shot multivibrator coupled to said differentiating circuit and to said binary scaler in such a manner as to reset the $n$ stages of said scaler in response to each voltage spike produced by said differentiating circuit.

5. The network defined in claim 2 wherein said second means includes a gating circuit receptive of the sync code pulses; means for gating On said gating circuit to pass said second occurring group of sync code pulses; and other means coupled to said gating circuit for sampling each of the sync code pulses in said second group to develop a voltage whose magnitude and polarity correspond to the degree and sense, respectively, that the time relationship between the synchronizing and sync code pulses differs from said second predetermined time relationship, said other means being coupled to said clock pulse generating means for applying said voltage thereto to shift said clock pulses in time until the synchronizing pulses are in said second predetermined time relationship with the sync code pulses.

6. The network defined in claim 5 wherein said other means includes first and second circuits coupled to said binary scaler and respectively operable in response to a predetermined pair of successively occurring output signal patterns therefrom to periodically produce a pair of successively occurring pulses coinciding with the sync code pulses; a third circuit coupled to said first and second circuits and to said gating circuit, said third circuit being operable in response to said successively occurring pairs of pulses to respectively pass coinciding portions of corresponding sync code pulses, the portions of the sync code pulses coinciding with the second pulses of the pairs of pulses being first inverted, thereby passing positive and negative portions of the sync code pulses; and means connected to said third circuit for smoothing said sync code pulse portions to develop said voltage.

7. A network that is responsive to a sync code signal comprising a sequence of pulses to produce synchronizing pulses having a predetermined time relationship with said sync code pulses, said network comprising: a source of clock pulses having a pulse repetition rate that is $2^n$ times greater than the pulse repetition rate of the sync code pulses, where $n$ is an integer greater than zero; a binary scaler coupled to said source and having $n$ stages, said scaler being operable in response to each successive group of $2^n$ clock pulses to produce a predetermined output signal patern; means coupled to said binary scaler and operable in response to each said predetermined output signal pattern; means coupled to said binary scaler whereby a train of synchronizing pulses is produced having the same pulse repetition frequency as the sync code pulses; first and second gating circuits receptive of the sync code pulses; first and second pulse means for respectively gating On said first and second gating circuits to pass first and second occurring groups of sync code pulses in the sequence; threshold means coupled to said first gating circuit for passing only those of said first occurring group of sync code pulses that exceed the biasing voltage level of said threshold circuit; a one-shot multivibrator coupled between said threshold means and the $n$ stages of said binary scaler, said multivibrator producing a pulse to reset the $n$ stages of said binary scaler in response to each pulse passed by said threshold means, thereby to establish a first predetermined time relationship between the sync code and the synchronizing pulses; and additional means coupled between said second gating circuit and said clock pulse source, said additional means sampling each of the sync code pulses in said second occurring group of sync code pulses to develop and apply to said clock pulse source a voltage whose magnitude and polarity correspond to the degree and sense, respectively, that the time relationship between the synchronizing and the sync code pulses differs from a second predetermined time relationship, said voltage causing said clock pulses to be shifted in time until the synchronizing pulses are in said second predetermined time relationship with the sync code pulses.

8. The network defined in claim 7 wherein said additional means includes first and second circuits coupled to said binary scaler and respectively operable in response to a predetermined pair of successively occurring output signal patterns therefrom to periodically produce a pair of successively occurring pulses coinciding with the sync code pulses; a third circuit coupled to said first and second circuits and to said second gating circuit, said third circuit being operable in response to said successively occurring pairs of pulses to respectively pass coinciding portions of corresponding sync code pulses, the portions of the sync code pulses coinciding with the second pulses of the pairs of pulses being first inverted, thereby passing positive and negative portions of the sync code pulses; and means connected to said third circuit for smoothing said sync code pulse portions to develop said voltage.

9. A network that is responsive to a sync code signal comprising a sequence of pulses to produce synchronizing pulses having a predetermined time relationship with said sync code pulses, said network comprising: a source of clock pulses having a pulse repetition rate that is $2^n$ times greater than the pulse repetition rate of the sync code pulses, where $n$ is an integer greater than zero; a binary scaler coupled to said source and having $n$ stages, said scaler being operable in response to each successive group of $2^n$ clock pulses to produce a predetermined output signal pattern; means coupled to said binary scaler and operable in response to each said predetermined output signal pattern to produce a synchronizing pulse, whereby a train of synchronizing pulses is produced having the same pulse repetition frequency as the sync code pulses; first and second gating circuits receptive of the sync code pulses; first and second pulse means for respectively gating On said first and second gating circuits to pass first and second occurring groups of sync code pulses in the sequence; a diode and an integrating circuit connected in series between said first gating circuit and ground, the diode being connected to said first gating circuit, said integrating circuit producing a voltage that successively rises exponentially in response to those of said first occurring group of sync code pulses that pass through said diode; a differentiating circuit connected to said integrating circuit, said differentiating circuit producing voltage spikes in response to the rising portions of the voltage out of said integrating circuit; a one-shot multivibrator coupled between said differentiating circuit and the $n$ stages of said binary scaler, said multivibrator producing a pulse to reset the $n$ stages of said binary scaler in response to each voltage spike produced by said differentiating circuit, thereby to establish a first predetermined time relationship between the sync code and the synchronizing pulses; and additional means sampling each of the sync code pulses in said second occurring group of sync code pulses to develop and apply to said clock pulse source a voltage whose magnitude and polarity correspond to the degree and sense, respectively, that time relationship between the synchronizing and the sync code pulses differs from a second predetermined time relationship, said voltage causing said clock pulses to be shifted in time until the synchronizing pulses are in said second predetermined time relationship with the sync code pulses.

10. The network defined in claim 9 wherein said additional means includes first and second circuits coupled to said binary scaler and respectively operable in response to a predetermined pair of successively occurring output signal patterns therefrom to periodically produce a pair of successively occurring pulses coinciding with the sync code pulses; a third circuit coupled to said first and second circuits and to said gating circuit, said third circuit being operable in response to said successively occurring pairs of pulses to respectively pass coinciding portions of corresponding sync code pulses, the portions of the sync code pulses coinciding with the second pulses of the pairs of pulses being first inverted, thereby passing positive and negative portions of the sync code pulses; and means connected to said third circuit for smoothing said sync code pulse portions to develop said voltage.

11. A network that is responsive to a sync code signal comprising a sequence of pulses to produce synchronizing pulses having a predetermined time relationship with said sync code pulses, said network comprising: a voltage-controlled source of clock pulses having a pulse repetition frequency that is $2^n$ times greater than the pulse repetition frequency of the sync code pulses, where $n$ is an integer greater than zero; a binary scaler coupled to said source and having $n$ stages, said scaler being operable in response to each successive group of $2^n$ clock pulses to produce a predetermined signal pattern at the output of said $n$ stages; a first multiple-input AND gate coupled to said $n$ scaler stages and operable in response to each said predetermined signal pattern to produce a synchronizing pulse, whereby a train of synchronizing pulses is produced having the same pulse repetition frequency as the sync code pulses; first and second gating circuits receptive of the sync code pulses; first and second pulse means for respectively gating On said first and second gating circuits to pass first and second occurring groups of sync code pulses in the sequence; a threshold circuit connected to said first gating circuit for passing only those of said first occurring group of sync code pulses that exceed the threshold voltage level of said threshold circuit; a one-shot multivibrator coupled between said threshold circuit and the $n$ stages of said binary scaler, said multivibrator producing a pulse to reset said $n$ stages in response to each pulse passed by said threshold circuit, thereby to establish a first predetermined time relationship between the sync code and the synchronizing pulses; second and third multiple-input AND gates coupled to said $n$ scaler stages and respectively operable in response to a predetermined pair of successively occurring scaler signal patterns to periodically produce a pair of successively occurring pulses coinciding with the sync code pulses; an early-late gate coupled to said second and third multiple-input AND gates and to said second gating circuit, said early-late gate being operable in response to said successively occurring pairs of pulses to respectively pass coinciding portions of corresponding sync code pulses, the portions of the sync code pulses coinciding with the second pulses of the pairs of pulses being first inverted, thereby passing positive and negative portions of the sync code pulses; a low-pass filter connected to said early-late gate for smoothing said sync code pulse portions to develop a voltage whose magnitude and polarity correspond to the degree and sense, respectively, that the time relationship between the synchronizing and sync code pulses differs from a second predetermined time relationship, said filter being connected to said clock pulses in time until the synchronizing pulses are in said second predetermined time relationship with the sync code pulses.

12. A network that is responsive to a sync code signal comprising a sequence of pulses to produce synchronizing pulses having a predetermined time relationship with said sync code pulses, said network comprising: a voltage-controlled source of clock pulses having a pulse repetition frequency that is $2^n$ times greater than the pulse repetition frequency of the sync code pulses, where $n$ is an integer greater than zero; a binary scaler coupled to said source and having $n$ stages, said scaler being operable in response to each successive group of $2^n$ clock pulses to produce a predetermined signal pattern at the output of said $n$ stages; a first multiple-input AND gate coupled to said $n$ scaler stages and operable in response to each said predetermined signal pattern to produce a synchronizing pulse, whereby a train of synchronizing pulses is produced having the same pulse repetition frequency as the sync code pulses; first and second pulse means for respectively gating On said first and second gating circuits to pass first and second occurring groups of sync code pulses in the sequence; a diode and an integrating circuit connected in series between said first gating circuit and ground, the diode being connected to said first gating circuit, said integrating circuit producing a voltage that successively rises exponentially in response to those of said first occurring group of sync code pulses that pass through said diode; a differentiating circuit connected to said integrating circuit, said differentiating circuit producing voltage spikes in response to the rising portions of the voltage out of said integrating circuit, a one-shot multi-vibrator coupled between said differentiating circuit and the $n$ stages of said binary scaler, said multivibrator producing a pulse to reset the $n$ stages of said binary scaler in response to each voltage spike produced by said differentiating circuit, thereby to establish a first predetermined time relationship between the sync code and the synchronizing pulses; second and third multiple-input AND gates coupled to said $n$ scaler stages and respectively operable in response to a predetermined pair of successively occurring scaler signal patterns to periodically produce a pair of successively occurring pulses coinciding with the sync code pulses; an early-late gate coupled to said second and third multiple-input AND gates and to said second gating circuit, said early-late gate being operable in response to said successively occurring pairs of pulses to respectively pass coinciding portions of corresponding sync code pulses, the portions of the sync code pulses coinciding with the second pulses of the pairs of pulses being first inverted, thereby passing positive and negative portions of the sync code pulses; a low-pass filter connected to said early-late gate for smoothing said sync code pulse portions to develop a voltage whose magnitude and polarity correspond to the degree and sense, respectively, that the time relationship between the synchronizing and sync code pulses differs from a second predetermined time relationship, said filter being connected to said clock pulse source to apply said voltage thereto to shift said clock pulses in time until the synchronizing pulses are in said second predetermined time relationship with the sync code pulses.

13. A network that is responsive to a sync code signal comprising a sequence of pulses to produce synchronizing pulses having a predetermined time relationship with said sync code pulses, said network comprising: an adjustable source of synchronizing pulses; first means coupled to said source and operable in response to a first occurring group of sync code pulses in the sequence to coarsely adjust the synchronizing pulses to the predetermined time relationship relative to the sync code pulses; and second means coupled to said source and operable in response to a second occurring group of sync code pulses in the sequence to finely adjust the synchronizing pulses to the predetermined time relationship relative to the sync code pulses.

14. For use in a synchronizing network wherein synchronizing pulses are produced, a network responsive to positive and negative voltages for respectively interposing additional clock pulses between the clock pulses produced by a clock pulse generator and causing clock pulses to be omitted therefrom, said network comprising: first and second AND gates, each having first and second terminals, the second terminals of said AND gates being connected to receive the synchronizing pulses; first and second diodes respectively connected to said first and second AND gates, the anode of said first diode being connected to the first terminal of said first gate, the cathode of said second diode being connected to the first terminal of said second gate, and the cathode and anode of said first and second diodes, respectively, being connected to receive the positive and negative voltages; means for reversely biasing said first and second diodes at voltage levels below the magnitudes of the positive and negative voltages; first and second pulse generating circuits respectively connected to said first and second AND gates, said first circuit being operable in response to a signal out of said first AND gate to produce an inhibit pulse whose duration is equal to the period of the clock pulses and said second circuit being operable in response to a signal out of said second AND gate to produce an additional clock pulse; an INHIBIT gate having first and second terminals respectively connected to said first pulse generating circuit and to the clock pulse generator, said INHIBIT gate normally passing the clock pulses and being operable in response to an inhibit pulse from said first pulse generating circuit to prevent a clock pulse from passing therethrough; and an OR gate having first and second terminals respectively connected to said second pulse generating circuit and to the output end of said INHIBIT gate, said OR gate at all times passing the clock pulses applied to its terminals.

15. For use in a synchronizing network wherein synchronizing pulses are produced, a network responsive to positive and negative voltages for respectively interposing additional clock pulses between the clock pulses produced by a clock pulse generator and causing clock pulses to be omitted therefrom, said network comprising: first means responsive to the negative voltage to produce an inhibit pulse whose duration is substantially equal to the period between the clock pulses; second means responsive to the positive voltage to produce an additional clock pulse; an INHIBIT gate coupled to said first means and to the clock pulse generator, said INHIBIT gate normally passing the clock pulses and being operable in response to said inhibit pulse to prevent a clock pulse from passing therethrough; and an OR gate coupled to said second means and to the output end of said INHIBIT gate, said OR gate at all times passing the clock pulses applied to it.

16. The network defined in claim 15 wherein said first means includes an AND gate having first and second input terminals, said second terminal being connected to receive the synchronizing pulses; a diode connected to pass only the negative voltage to the first terminal of said AND gate; and a one-shot multivibrator connected to said AND gate and operable in response to a signal therefrom to produce said inhibit pulse.

17. The network defined in claim 15 wherein said second means includes an AND gate having first and second input terminals, said second terminal being connected to receive the synchronizing pulses; a diode connected to pass only the positive voltage to the first terminal of said AND gate; and a one-shot clock pulse generator connected to said AND gate and operable in response to a signal therefrom to produce said additional clock pulse.

18. A network that is responsive to a sync code signal comprising a sequence of pulses to produce synchronizing pulses having a predetermined time relationship with said sync code pulses, said network comprising: source means operable to produce synchronizing pulses in response to the application thereto of clock pulses; first means coupled to said source and operable in response to a first occurring group of sync code pulses in the sequence to coarsely adjust the synchronizing pulses to the predetermined time relationship relative to the sync code pulses; and second means coupled to said source and operable in response to a second occurring group of sync code pulses in the sequence to finely adjust the synchronizing pulses to the predetermined time relationship relative to the sync code pulses, said second means including a source of clock pulses, apparatus coupled to said synchronizing pulse source means and operable in response to said second occurring group of sync code pulses to produce positive and negative voltages corresponding to the degree and sense of the deviation of time relationship between the sync code pulses and said synchronizing pulses from the predetermined time relationship, third means coupled to said apparatus and operable in response to a negative voltage therefrom to produce an inhibit pulse whose duration is substantially equal to the period between said clock pulses, fourth means coupled to said apparatus and operable in response to a positive voltage therefrom to produce an additional clock pulse, an INHIBIT gate coupled to said third means and to the clock pulse source, said INHIBIT gate normally passing said clock pulses and being operable in response to an inhibit pulse to prevent a clock pulse from passing therethrough, and an OR gate coupled to said fourth means and to the output end of said INHIBIT gate, said OR gate at all times passing the clock pulses applied to it to said synchronizing pulse source means.

19. The network defined in claim 18 wherein said third means includes an AND gate having first and second input terminals, said second terminal being connected to receive the synchronizing pulses; a diode connected to pass only a negative voltage to the first terminal of said AND gate; a one-shot multivibrator connected to said AND gate and operable in response to a signal therefrom to produce said inhibit pulse; and herein said second means includes an AND gate having first and second input terminals, said second terminal being connected to receive the synchronizing pulses; a diode connected to pass only a positive voltage to the first terminal of said AND gate; and a one-shot multivibrator connected to said AND gate and operable in response to a signal therefrom to produce said additional clock pulse.

References Cited in the file of this patent

UNITED STATES PATENTS 2,850,628 Davidoff ---------------- Sept. 2, 1958